(12) United States Patent
Uchida et al.

(10) Patent No.: US 10,376,952 B2
(45) Date of Patent: Aug. 13, 2019

(54) MOLDING MACHINE CYLINDER AND ITS PRODUCTION METHOD

(71) Applicant: HITACHI METALS, LTD., Tokyo (JP)

(72) Inventors: Masatsugu Uchida, Kitakyusyu (JP); Kiyoshi Furushima, Kitakyusyu (JP)

(73) Assignee: HITACHI METALS, LTD., Tokyo (JP)

( * ) Notice: Subject to any disclaimer, the term of this patent is extended or adjusted under 35 U.S.C. 154(b) by 158 days.

(21) Appl. No.: 15/120,675

(22) PCT Filed: Feb. 25, 2015

(86) PCT No.: PCT/JP2015/055431
§ 371 (c)(1),
(2) Date: Aug. 22, 2016

(87) PCT Pub. No.: WO2015/129754
PCT Pub. Date: Sep. 3, 2015

(65) Prior Publication Data
US 2017/0008077 A1   Jan. 12, 2017

(30) Foreign Application Priority Data
Feb. 25, 2014  (JP) ................. 2014-034238

(51) Int. Cl.
*B22D 13/02* (2006.01)
*B22D 21/00* (2006.01)
(Continued)

(52) U.S. Cl.
CPC ......... *B22D 13/02* (2013.01); *B22D 17/2023* (2013.01); *B22D 19/08* (2013.01);
(Continued)

(58) Field of Classification Search
CPC ........ B22D 13/02; B22D 21/06; B22D 23/06; B22D 21/005; B22D 17/2023;
(Continued)

(56) References Cited

U.S. PATENT DOCUMENTS 4,089,466 A   5/1978  Lomax et al.
4,430,389 A   2/1984  Otani

FOREIGN PATENT DOCUMENTS

JP   58-157944 A   9/1983
JP   2872571 B2   3/1999
(Continued)

OTHER PUBLICATIONS

JP2008201080 English translation.*
International Search Report of PCT/JP2015/055431, dated Apr. 7, 2015. [PCT/ISA/210].

*Primary Examiner* — Joseph S Del Sole
*Assistant Examiner* — Mohamed K Ahmed Ali
(74) *Attorney, Agent, or Firm* — Sughrue Mion, PLLC

(57) ABSTRACT

A molding machine cylinder comprising a lining layer having a structure comprising 20-50% by area of tungsten carbide particles and 1-10% by area of tungsten-based metal carboboride particles in a nickel-based alloy matrix, and containing 1-7.5% by mass of Fe, can be produced by a centrifugal casting method comprising a first step of heating at higher than 1140° C. and lower than 1200° C., and a second step of heating at 1080-1140° C. after melting the raw material powder.

5 Claims, 2 Drawing Sheets

(51) Int. Cl.
  B22D 21/06    (2006.01)
  B22D 23/06    (2006.01)
  B22F 1/00     (2006.01)
  B29C 33/38    (2006.01)
  C22C 19/05    (2006.01)
  C22C 32/00    (2006.01)
  B22D 17/20    (2006.01)
  B22D 19/08    (2006.01)
  B29C 45/62    (2006.01)
  C22C 19/00    (2006.01)
  C22C 19/03    (2006.01)
  C22C 29/08    (2006.01)
  B29C 48/68    (2019.01)
  B29L 31/00    (2006.01)

(52) U.S. Cl.
  CPC .......... *B22D 21/005* (2013.01); *B22D 21/06* (2013.01); *B22D 23/06* (2013.01); *B22F 1/0003* (2013.01); *B29C 33/38* (2013.01); *B29C 45/62* (2013.01); *C22C 19/007* (2013.01); *C22C 19/03* (2013.01); *C22C 19/056* (2013.01); *C22C 19/057* (2013.01); *C22C 19/058* (2013.01); *C22C 29/08* (2013.01); *C22C 32/0052* (2013.01); *B22F 2302/10* (2013.01); *B22F 2302/45* (2013.01); *B22F 2304/10* (2013.01); *B29C 48/68* (2019.02); *B29K 2905/00* (2013.01); *B29L 2031/757* (2013.01)

(58) Field of Classification Search
  CPC ... B22D 19/08; C22C 19/056; C22C 32/0052; C22C 19/057; C22C 29/08; C22C 19/03; C22C 29/02; C22C 32/0047; B29C 33/38; B29C 45/62; B29C 47/66; B29L 2031/757
  See application file for complete search history.

(56) References Cited

FOREIGN PATENT DOCUMENTS

| | | |
|---|---|---|
| JP | 2006-75906 A | 3/2006 |
| JP | 2008-201080 A | 9/2008 |
| JP | 2009-113457 A | 5/2009 |
| JP | 2010-99693 A | 5/2010 |
| JP | 2010-247212 A | 11/2010 |
| JP | 4900806 B2 | 3/2012 |
| JP | 5095669 B2 | 12/2012 |

* cited by examiner

MOLDING MACHINE CYLINDER AND ITS PRODUCTION METHOD

CROSS REFERENCE TO RELATED APPLICATIONS

This application is a National Stage of International Application No. PCT/JP2015/055431 filed Feb. 25, 2015 (claiming priority based on Japanese Patent Application No. 2014-034238, filed Feb. 25, 2014), the contents of which are incorporated herein by reference in their entirety.

FIELD OF THE INVENTION

The present invention relates to a molding machine cylinder comprising a lining layer having excellent wear resistance and corrosion resistance, and a method for producing such a molding machine cylinder by a centrifugal casting method at low cost.

BACKGROUND OF THE INVENTION

A molding machine cylinder used for injection-molding or extrusion-molding plastics, etc., is required to be resistant to wear by resins, additives, etc. during thermal molding, and be able to be produced at relatively low cost. To meet such requests, a bimetal-structure molding machine cylinder comprising a lining layer formed on an inner surface of a steel cylinder by a centrifugal casting method, the lining layer comprising tungsten carbide particles dispersed in a nickel alloy matrix, has conventionally been used.

To produce a molding machine cylinder having a lining layer, in which hard particles such as tungsten carbide particles, etc. are dispersed in a nickel alloy matrix, by a centrifugal casting method, a mixed powder of nickel alloy powder and tungsten carbide powder is melted and centrifugally cast in a cylinder, forming a centrifugally cast layer comprising an outer layer (lining layer), in which many hard particles having large specific gravities such as tungsten carbide particles, etc. are dispersed, and an inner layer containing less hard particles (particle-lack layer). Because the particle-lack layer should be removed to expose the lining layer, the particle-lack layer is preferably as thin as possible.

JP 2872571 B discloses a centrifugally cast composite tungsten carbide lining layer comprising 30-45% by weight of tungsten carbide, 35-50% by weight in total of nickel+cobalt, 1% or less by weight of molybdenum, 10% or less by weight of chromium, 1-3% by weight of boron, 1-3% by weight of silicon, 2% or less by weight of manganese, 8-25% by weight of iron, and 1% or less by weight of carbon. This lining layer has excellent wear resistance, because 25-45% by volume of tungsten carbide particles having an average particle size of 6-12 μm are dispersed. However, JP 2872571 B does not describe how to stably control the thickness of a particle-lack layer at all. With the particle-lack layer having uneven thickness, not only the particle-lack layer but also part of the lining layer should be removed for safety margin, resulting in a low production yield. Also, the lining layer containing as much iron as 8-25% by weight has poor corrosion resistance.

JP 4900806 B discloses a molding machine cylinder comprising a lining layer of a wear-resistant, corrosion-resistant alloy, which is formed on an inner surface of a hollow steel cylinder, the lining layer comprising a nickel-containing matrix, and hard particles comprising tungsten carbide dispersed in metal tungsten. JP 4900806 B describes that an area ratio of hard particles in the lining layer is 20-80%, and that the lining layer may further contain 5-20% by area of tungsten boride. JP 4900806 B further describes that tungsten boride is centrifugally separated together with hard particles during centrifugal casting, resulting in proper distances between hard particles in the lining layer. However, it is difficult to stably control the thickness of the particle-lack layer in this cylinder, too. With the particle-lack layer having uneven thickness, the centrifugally cast layer should be cut deep to remove the unevenly thick particle-lack layer, resulting in a low material yield. In addition, special particles containing tungsten carbide dispersed in metal tungsten should be prepared as hard particles, resulting in a high production cost.

JP 5095669 B discloses a lining material centrifugally cast in a cylinder, which comprises 30-45% by mass in total of tungsten boride+tungsten carbide (tungsten boride/tungsten carbide=1 or less, and tungsten boride: 5-20% by mass), 35-50% by mass in total of nickel+cobalt, 1% or less by mass of molybdenum, 10% or less by mass of chromium, 1-3% by mass of boron, 1-3% by mass of silicon, 2% or less by mass of manganese, 5% or less by mass of iron, 1% or less by mass of carbon, and inevitable impurities. JP 5095669 B describes that with an adjusted mass ratio of tungsten carbide powder to tungsten boride powder, the thickness of a particle-lack layer is controlled. However, tungsten boride powder added to the lining material in advance leads to a high material cost, and is dissolved in an alloy melt during casting because tungsten boride is poorer than tungsten carbide in thermal stability. In addition, tungsten boride particles having particle sizes of several micrometers or less, much smaller than the alloy powder in a raw material, are not easily dispersed uniformly. Further, with too large a total amount of tungsten carbide powder and tungsten boride powder, these powders have insufficient fluidity during centrifugal casting, failing to achieve the uniform dispersion of tungsten carbide particles and tungsten boride particles.

JP 2010-99693 A discloses a method for producing a wear-resistant lining layer by (a) adding boride powder including WB or MoB to Co-based or N-based alloy powder containing B and Cr to prepare a mixed powder, (b) charging the mixed powder into a cylinder, (c) melting the mixed powder by heating it to a temperature of 1200° C. or higher while rotating the cylinder at 3 rpm, (d) forming a lining layer by centrifugal casting, in which the cylinder is rotated at a high speed of 2290-2300 rpm, and (e) finishing an inner surface of the lining layer by machining. However, because the mixed powder is melted at a high temperature of 1200° C. or higher in this method, the inner surface of the cylinder is eroded, so that a large amount of molten Fe enters the lining layer. Because the lining layer exhibits low corrosion resistance with a large Fe content, the erosion of the inner surface of the cylinder should be minimized during melting the mixed powder. Though boride powder is added in this method, tungsten boride is partially melted in the alloy melt because of poorer thermal stability than tungsten carbide, resulting in insufficient improvement in wear resistance.

OBJECTS OF THE INVENTION

Accordingly, the first object of the present invention is to provide a molding machine cylinder comprising a centrifugally cast lining layer having excellent wear resistance and corrosion resistance.

The second object of the present invention is to provide a method for producing a molding machine cylinder comprising a lining layer having excellent wear resistance and corrosion resistance, with a small cutting depth of a centrifugally cast layer by stably controlling the thickness of a particle-lack layer, thereby forming the lining layer at low cost.

DISCLOSURE OF THE INVENTION

The molding machine cylinder of the present invention comprises a lining layer formed on an inner surface of a steel cylinder by a centrifugal casting method; the lining layer having a structure comprising 20-50% by area of tungsten carbide and 1-10% by area of tungsten-based metal carboboride particles in a nickel-based alloy matrix; and the lining layer containing 1-7.5% by mass of Fe.

The metal carboboride particles preferably comprise 0.5-4% by mass of C, 0.5-6% by mass of B, 65-85% by mass of W, and 1-20% by mass of Ni.

The metal carboboride particles preferably have an average particle size of 0.5-5 µm.

The tungsten carbide preferably has an average particle size of 1.5-15 µm.

The lining layer preferably comprises 1.5-4% by mass of C, 0.5-3.5% by mass of B, 25-60% by mass of W, 1-10% by mass of Cr, 1-15% by mass of Co, 0.1-3% by mass of Si, 0.1-2% by mass of Mn, and 0-5% by mass of Cu, the balance being nickel and inevitable impurities.

A matrix of the lining layer preferably comprises 0.05-1% by mass of C, 0.5-3% by mass of B, 1-5% by mass of W, 2-20% by mass of Cr, 2-30% by mass of Co, 0.2-5% by mass of Si, 0.2-5% by mass of Mn, 2-15% by mass of Fe, and 0-10% by mass of Cu, the balance being nickel and inevitable impurities.

The method of the present invention for producing a molding machine cylinder comprising a lining layer having a structure comprising 20-50% by area of tungsten carbide particles and 1-10% by area of tungsten-based metal carboboride particles in a nickel-based alloy matrix, and containing 1-7.5% by mass of Fe, comprises the steps of charging a raw material for the lining layer comprising 40-70 parts by mass of nickel-based alloy powder containing 1-5% by mass of B, and 60-30 parts by mass of tungsten carbide powder, into a steel cylinder;

melting the raw material for the lining layer while rotating the cylinder at 5-30 rpm;

increasing the number of rotation of the cylinder for centrifugal casting, to form a centrifugally cast layer comprising an outside lining layer and an inside particle-lack layer, on an inner surface of the cylinder; and removing the particle-lack layer by machining;

the raw material for the lining layer being melted by a first step of heating at higher than 1140° C. and lower than 1200° C., and a second step of heating at 1080-1140° C. after the first heating step.

The alloy powder preferably comprises 0.01-1% by mass of C, 1-5% by mass of B, 2-20% by mass of Cr, 0.2-5% by mass of Si, 0.2-5% by mass of Mn, 22-30% by mass of Co, 0-5% by mass of Cu, and 0-1% by mass of Fe, the balance being nickel and inevitable impurities.

The alloy powder preferably has an average particle size of 20-300 µm.

The tungsten carbide powder preferably has an average particle size of 1.5-15 µm.

EFFECTS OF THE INVENTION

Because a raw material for a lining layer is melted by a first step of heating at higher than 1140° C. and lower than 1200° C., and the second step of heating at 1080-1140° C. in the present invention, the thickness of a particle-lack layer can be stably controlled without adding tungsten boride powder to the raw material powder. Accordingly, the cutting depth of a centrifugally cast layer to expose the lining layer completely can be reduced, lowering the production cost of the molding machine cylinder.

DESCRIPTION OF THE PREFERRED EMBODIMENTS

The embodiments of the present invention will be explained in detail below without intention of restricting the present invention thereto. Proper modifications and improvements may be added based on the common knowledge of those skilled in the art, within a range not deviating from the technical idea of the present invention.

Figure 1:
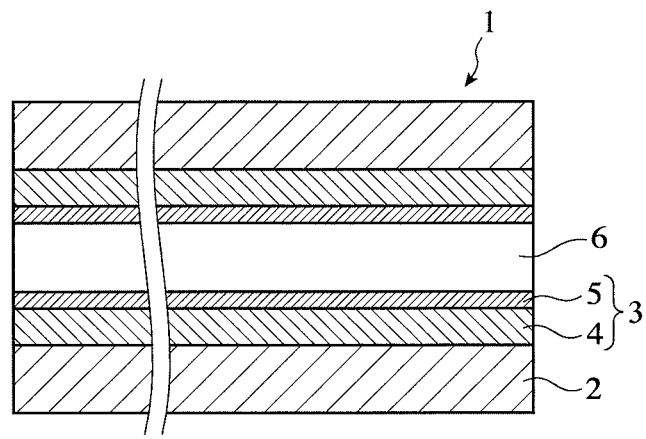
FIG. 1 is a schematic cross-sectional view showing the molding machine cylinder of the present invention.

As shown in FIG. 1, a melt of a raw material for a lining layer comprising nickel-based alloy powder containing B and tungsten carbide powder is centrifugally cast onto an inner surface of a steel cylinder 2, to form a centrifugally-cast hollow layer 3 on the inner surface of the steel cylinder 2. The centrifugally cast layer 3 comprises an outside lining layer 4 comprising many tungsten carbide particles and tungsten-based metal carboboride particles precipitated when the centrifugally cast layer 3 is formed, which are dispersed in a nickel-based alloy matrix, and an inside particle-lack layer 5 containing less tungsten carbide particles and metal carboboride particles. The centrifugally cast layer 3 has a hollow portion 6 inside. The particle-lack layer 5 is removed from the centrifugally cast layer 3 by machining, with the lining layer 4 having a predetermined thickness remaining, thereby obtaining the molding machine cylinder 1 of the present invention.

[1] Molding Machine Cylinder (A) Composition of Lining Layer

Because the lining layer 4 has a structure in which tungsten carbide particles and tungsten-based metal carboboride particles are dispersed in a nickel-based alloy matrix, the composition of the entire lining layer 4 differs from the matrix composition. In order that the lining layer 4 exhibits excellent wear resistance and corrosion resistance with chipping suppressed during machining, the lining layer 4 preferably has the following composition (average composition including both matrix and hard particles).

(1) C: 1.5-4% by Mass

C is combined with W to form tungsten carbide particles and tungsten-based metal carboboride particles. When C is less than 1.5% by mass, tungsten carbide particles and metal carboboride particles are insufficiently formed, failing to obtain sufficient wear resistance. On the other hand, when C exceeds 4% by mass, the lining layer 4 becomes brittle, resulting in low machinability. The C content is preferably 2-3.5% by mass.

(2) B: 0.5-3.5% by Mass

B is an element constituting metal carboride particles, contributing to increasing wear resistance and stabilizing the thickness of the particle-lack layer. When B is less than 0.5% by mass, this effect is not obtained sufficiently. On the other hand, when B exceeds 3.5% by mass, the lining layer 4 becomes brittle, resulting in low machinability. The B content is preferably 1-2.5% by mass.

(3) W: 25-60% by Mass

W is combined not only with C to form tungsten carbide particles, but also with B and C to form tungsten-based metal carboride particles. When W is less than 25% by mass, tungsten carbide particles and metal carboride particles are insufficiently formed, failing to obtain sufficient wear resistance and to sufficiently stabilize the thickness of the particle-lack layer. On the other hand, when W exceeds 60% by mass, the lining layer 4 becomes brittle, resulting in low machinability. The W content is preferably 35-50% by mass.

(4) Nickel: Balance

Ni is a main element constituting the matrix. The matrix containing 20% or more by mass of Ni exhibits excellent corrosion resistance. The Ni content is preferably 25% or more by mass, more preferably 30% or more by mass.

The lining layer 4 properly contains the following elements, depending on the application and usage of the molding machine cylinder 1.

(5) Co: 1-15% by Mass

Like Ni, Co has a function of imparting corrosion resistance to the lining layer 4, and is dissolved in the matrix to improve the strength. When Co is less than 1% by mass, these effects are not obtained sufficiently. On the other hand, when Co exceeds 15% by mass, these effects are saturated, economically disadvantageous. The Co content is more preferably 2-10% by mass.

(6) Cr: 1-10% by Mass

Cr is mainly dissolved in the matrix to increase the strength, and forms chromium-based metal carboride particles. When Cr is less than 1% by mass, the strength-improving effect is unlikely obtained. On the other hand, when Cr exceeds 10% by mass, excessive chromium-based metal carboride particles are formed, resulting in a brittle lining layer 4. The Cr content is more preferably 2-8% by mass. The amount of chromium-based metal carboride particles formed may be less than 1% by area of the lining layer 4.

(7) Fe: 1-7.5% by Mass

Fe is dissolved in the matrix, contributing to improving adhesion to the cylinder. At least part of Fe comes from the steel cylinder fused by centrifugal casting. When Fe is less than 1% by mass, sufficient adhesion to the cylinder is not obtained. On the other hand, more than 7.5% by mass of Fe provides low corrosion resistance. The Fe content is more preferably 1-7% by mass. The most preferable upper limit of the Fe content is 6% by mass.

(8) Si: 0.1-3% by Mass

Si is dissolved in the matrix of the lining layer 4, increasing hardness, and thus improving wear resistance. When Si is less than 0.1% by mass, this effect is insufficient. On the other hand, when Si exceeds 3% by mass, the lining layer 4 becomes brittle. The Si content is more preferably 0.5-2.5% by mass.

(9) Mn: 0.1-2% by Mass 0.1% or more by mass of Mn exhibits a sufficient effect of removing foreign matter such as oxides, etc. However, when Mn exceeds 2% by mass, the corrosion resistance of the lining layer 4 is undesirably deteriorated. The Mn content is more preferably 0.2-1% by mass.

(10) Cu: 0-5% by Mass

Cu is dissolved in the matrix of the lining layer 4 to improve the strength. When it exceeds 5% by mass, the corrosion resistance of the lining layer 4 is deteriorated. The Cu content is more preferably 0-3% by mass.

(B) Composition of Lining Layer Matrix

After metal carboride particles are precipitated, the matrix of the lining layer 4 preferably contains 50% or more by mass of nickel. The matrix may contain Co, Cr, Si, C, B, Mn, W, Fe, Cu, etc., in addition to Ni. The matrix of the lining layer 4 has a preferred composition comprising 50-75% by mass of Ni, 2-30% by mass of Co, 2-20% by mass of Cr, 0.2-5% by mass of Si, 0.05-1% by mass of C, 0.5-3% by mass of B, 1-5% by mass of W, 0.2-5% by mass of Mn, 2-15% by mass of Fe, and 0-10% by mass of Cu, the balance being inevitable impurities. Fe is more preferably 2-10% by mass.

(C) Hard Particles (1) Tungsten Carbide Particles

The nickel-based alloy matrix of the lining layer 4 has a structure in which 20-50% by area of tungsten carbide particles and 1-10% by area of tungsten-based metal carboride particles are dispersed. 1-10% by area of metal carboride particles can suppress the aggregation of tungsten carbide, making the particle-lack layer 5 in the centrifugally cast layer 3 thinner, and stably controlling the thickness of the particle-lack layer 5. Accordingly, the centrifugally cast layer 3 needs not be cut deep, resulting in a high material yield.

When tungsten carbide particles are less than 20% by area, the lining layer 4 does not have sufficient wear resistance. On the other hand, when tungsten carbide particles exceed 50% by area, the lining layer 4 becomes brittle, resulting in low machinability. Accordingly, the amount of tungsten carbide particles is 20-50% by area, preferably 25-40% by area. The "% by area" of tungsten carbide particles is determined by measuring the area of tungsten carbide particles whose maximum diameters are 1 μm or more in a photograph of a cross section of the lining layer 4 [photograph (magnification: 1000 times) mapping-analyzed by EPMA to identify a matrix, tungsten carbide particles and metal carboride particles] by image analysis, and dividing it by the entire area of the cross section. The image analysis was conducted by image analysis software (Image-Pro Plus ver. 6.3 available from Media Cybernetics) on a photograph of a cross section of the lining layer 4.

The tungsten carbide particles preferably have an average particle size of 1.5-15 μm. The average particle size is determined by number-averaging the maximum diameters of tungsten carbide particles. When the average particle size of tungsten carbide particles is less than 1.5 μm, the lining layer 4 has low wear resistance. On the other hand, when the average particle size of tungsten carbide particles exceeds 15 μm, tungsten carbide particles are likely detached and chipped when inner corners of the cylinder 2 are machined, resulting in reduced machinability. The average particle size of tungsten carbide particles is more preferably 2-10 μm, further preferably 2-8 μm.

(2) Metal Carboride Particles

Metal carboride particles having more affinity than tungsten boride (WB) particles to the matrix have higher adhesion strength to the matrix, avoiding the deterioration of wear resistance by detaching. The metal carboride particles also suppress the aggregation and segregation of tungsten carbide particles, contributing to providing the lining layer 4 with more uniform wear resistance. Further, by suppressing the aggregation and segregation of tungsten carbide particles, the thickness of the particle-lack layer 5 in the centrifugally cast layer 3 can be stably controlled.

When the metal carboboride particles are less than 1% by area, tungsten carbide particles are aggregated in the lining layer 4, failing to stably control the thickness of the particle-lack layer. On the other hand, when metal carboboride particles exceed 10% by area, the metal carboboride particles likely become larger, resulting in more chipping during machining, and thus lower machinability. Accordingly, the amount of metal carboboride particles is 1-10% by area, preferably 1-5% by area, more preferably 1.5-4% by area. To suppress the aggregation of tungsten carbide particles, an area ratio of metal carboboride particles/tungsten carbide particles is preferably 0.05-0.2, more preferably 0.07-0.12. The "% by area" of metal carboboride particles is determined by measuring the area of metal carboboride particles whose maximum diameters are 0.5 µm or more in a photograph of a cross section of the lining layer 4 by image analysis, and dividing it by the entire area of the cross section. The image analysis was conducted by image analysis software (Image-Pro Plus ver. 6.3 available from Media Cybernetics) on a photograph of a cross section of the lining layer 4 (photograph mapping-analyzed by EPMA to identify a matrix, tungsten carbide particles and metal carboboride particles).

The metal carboboride particles preferably comprise 65-85% by mass of W, 0.5-6% by mass of B, 0.5-4% by mass of C, and 1-20% by mass of Ni. W is a main element constituting metal carboboride particles, forming carboboride with C and B in the above ranges. W is more preferably 70-80% by mass, B is more preferably 2-5% by mass, and C is more preferably 1-3% by mass. The metal carboboride particles may contain trace amounts of metal components such as Fe, Cr, Co, etc., in addition to W and Ni.

When the metal carboboride particles contain 1% or more by mass of Ni, sufficient affinity for the matrix is obtained, with excellent adhesion to the matrix, resulting in less decrease in wear resistance by detaching. When Ni exceeds 20% by mass, metal carboboride particles have reduced hardness, resulting in low wear resistance. The Ni content in metal carboboride particles is more preferably 2-15% by mass.

The metal carboboride particles preferably have an average particle size of 0.5-5 µm. The average particle size is determined by number-averaging the maximum diameters of metal carboboride particles. When the average particle size of metal carboboride particles is 0.5 µm or more, the aggregation of tungsten carbide particles can be suppressed, thereby stabilizing the thickness of the particle-lack layer. However, when the average particle size of metal carboboride particles exceeds 5 µm, the lining layer 4 becomes brittle. The average particle size of metal carboboride particles is more preferably 1-3 µm. The average particle size of metal carboboride particles is preferably smaller than that of tungsten carbide particles. Specifically, an average particle size ratio of metal carboboride particles to tungsten carbide particles is preferably 0.2-0.5.

[2] Production Method of Cylinder for Molding Machine (A) Raw Material Powder (1) Alloy Powder The alloy powder is made of a Ni-based alloy containing at least 1-5% by mass of B. B lowers the melting point of the alloy powder to increase the fluidity of an alloy melt, and forms metal carboboride particles to improve the wear resistance and stabilize the thickness of the particle-lack layer 5. When B is less than 1% by mass, these effects are not obtained sufficiently. On the other hand, when B exceeds 5% by mass, the lining layer 4 becomes brittle. The B content is preferably 2-4% by mass. The Ni content in the Ni-based alloy is preferably 50% or more by mass. The alloy powder preferably contains 0.01-1% by mass of C, 2-20% by mass of Cr, 0.2-5% by mass of Si, 0.2-5% by mass of Mn, and 2-30% by mass of Co. The alloy powder may further contain 0-1% by mass of Fe, and 0-5% by mass of Cu.

The average particle size of the alloy powder is preferably 20-300 µm. When the average particle size of the alloy powder is less than 20 µm, the alloy powder has a large specific surface area, likely suffering surface oxidation during production and heating. On the other hand, when the average particle size of the alloy powder exceeds 300 µm, the tungsten carbide powder and the alloy powder exhibit large fluidity difference due to their particle size difference, so that both powders may be separated when the cylinder is rotated. The average particle size of the alloy powder is more preferably 50-200 µm. The average particle size was measured by a laser diffraction particle size analyzer (Microtrac).

(2) Tungsten Carbide Powder

The tungsten carbide powder preferably has an average particle size of 1.5-15 µm. When the average particle size of tungsten carbide powder exceeds 15 µm, tungsten carbide particles contained in the lining layer 4 have too large particle sizes, likely detached during machining. On the other hand, when the average particle size of tungsten carbide powder is less than 1.5 µm, the wear resistance of the lining layer 4 is not sufficiently improved. The average particle size of tungsten carbide powder is more preferably 7-15 µm, most preferably 7-12 µm. The average particle size was measured by a laser diffraction particle size analyzer (Microtrac). Also, fine tungsten carbide powder is preferably contained in a proper amount, because part of their surfaces are easily melted during heating (in the first heating step described below) before centrifugal casting, contributing to the precipitation of metal carboboride in centrifugal casting. The tungsten carbide powder preferably has a particle size distribution that particle sizes of 6 µm or less are 0.2-20% by weight.

(3) Formulation

A raw material for the lining layer comprises 40-70 parts by mass of the alloy powder and 60-30 parts by mass of the tungsten carbide powder. When the alloy powder is more than 70 parts by mass (the tungsten carbide powder is less than 30 parts by mass), the lining layer 4 does not have sufficient wear resistance. On the other hand, when the alloy powder is less than 40 parts by mass (the tungsten carbide powder is more than 60 parts by mass), the lining layer 4 has too high hardness. More preferably, the alloy powder is 40-60 parts by mass, and the tungsten carbide powder is 60-40 parts by mass.

(4) Melting

A mixed powder of the alloy powder and the tungsten carbide powder (raw material for the lining layer) is charged into a cylinder 2 made of steel such as SCM440, etc., and melted while rotating the cylinder 2 at 5-30 rpm. The heating step of the raw material for the lining layer comprises a first step of heating at higher than 1140° C. and lower than 1200° C., and a second step of heating at 1080-1140° C. after the first heating step.

(a) First Heating Step

By heating the raw material for the lining layer at a relatively high temperature of higher than 1140° C. and lower than 1200° C., part of surfaces of tungsten carbide particles are sufficiently melted in an alloy melt. A heating temperature of 1140° C. or lower does not sufficiently melt tungsten carbide, while a heating temperature of 1200° C. or higher erodes the steel cylinder too much, resulting in too high concentration of iron in the lining layer 4. The heating temperature in the first heating step is preferably 1150-1190° C. The heating time in the first heating step may be about 10-60 minutes. Because the heating temperature is sufficiently high in the first heating step, alloy oxides inevitably generated are melted and segregated on the inside during centrifugal casting, so that they do not remain in the lining layer 4.

(b) Second Heating Step

With as relatively low a heating temperature as 1080-1140° C., part of surfaces of tungsten carbide particles are further melted in the alloy melt while suppressing the erosion of the cylinder 2, causing sufficient reactions of W, B and C in the alloy melt to precipitate tungsten-based metal carboboride. The heating time in the second heating step is as relatively long as 60-120 minutes, to sufficiently precipitate metal carboboride. Because the second heating step is conducted for a relatively long period of time, the upper limit of the heating temperature should be 1140° C. or lower to suppress the erosion of the cylinder 2. The upper limit of the heating temperature is preferably 1135° C. When the heating temperature is lower than 1080° C., the alloy melt has low fluidity, resulting in a reduced stirring effect by rotation, failing to sufficiently obtain metal carboboride particles. The lower limit of the heating temperature is preferably 1100° C.

(c) Rotation Speed of Cylinder

With the cylinder 2 rotated at as relatively low a speed as 5-30 rpm in the first and second heating steps, the melting of tungsten carbide and the precipitation of metal carboboride are accelerated by stirring the alloy melt, while suppressing the erosion of an inner surface of the cylinder 2, and the temperature of the alloy melt is made uniform, resulting in uniformly precipitated metal carboboride particles. When the number of rotation of the cylinder 2 is less than 5 rpm, a stirring function is insufficient, failing to uniformly precipitate a sufficient amount of metal carboboride particles. On the other hand, the number of rotation of the cylinder 2 exceeding 30 rpm provides an excessive stirring function, likely making metal carboboride particles too large. The preferred number of rotation of the cylinder 2 is 5-15 rpm.

(5) Centrifugal Casting

After tungsten-based metal carboboride particles are precipitated while melting part of surfaces of tungsten carbide particles, the cylinder 2 is rotated at a high speed exceeding 1000 rpm (for example, 1200-2500 rpm) to carry out centrifugal casting. Because heating is not conducted during the centrifugal casting, the alloy melt is gradually cooled, so that metal carboboride particles are further precipitated. Thus formed is a centrifugally cast layer 3 composed of an outside lining layer 4 having many tungsten carbide particles and metal carboboride particles dispersed, and an inside particle-lack layer 5 containing less tungsten carbide particles and metal carboboride particles.

(6) Removal of Particle-Lack Layer

Because the particle-lack layer 5 has a stable thickness in the centrifugally cast layer 3 formed by the method of the present invention, the centrifugally cast layer 3 may be removed in small thickness by machining. If the particle-lack layer 5 had uneven thickness, removal would have to be conducted exceeding the particle-lack layer 5 to a relatively thick part of the lining layer 4 for safety margin, failing to obtain a lining layer 4 having sufficient thickness. Thus, the molding machine cylinder 1 comprising a lining layer 4 containing 20-50% by area of tungsten carbide particles and 1-10% by area of tungsten-based metal carboboride particles dispersed in a nickel-based alloy matrix, is obtained.

The present invention will be explained in more detail with Examples below, without intention of restricting the present invention thereto.

Examples 1-3, Reference Examples 1 and 2, and Comparative Examples 1-3

Each alloy powder having a composition shown in Table 1 was produced by a gas atomizing method, and classified by a sieve to have an average particle size shown in Table 2. Each alloy powder was dry-mixed with tungsten carbide powder having purity of 99% or more and an average particle size shown in Table 2. Table 2 shows the amounts of alloy powder and tungsten carbide powder in each raw material for the lining layer.

TABLE 1

| No. | Composition (% by mass) of Alloy Powder | | | | | | | | |
|---|---|---|---|---|---|---|---|---|---|
| | B | C | Cr | Fe | Si | Mn | Co | Cu | Ni |
| Example 1 | 3.1 | 0.05 | 8.3 | — | 3.6 | 1.1 | 8.1 | — | Balance |
| Example 2 | 2.6 | 0.12 | 12.5 | 0.1 | 3.6 | 1.1 | 18.5 | 2.5 | Balance |
| Example 3 | 3.1 | 0.05 | 8.3 | — | 3.6 | 1.1 | 8.1 | — | Balance |
| Ref. Ex. 1 | 3.8 | 0.08 | 15.8 | 4.9 | 3.6 | 1.1 | 35.0 | 5.2 | Balance |
| Ref. Ex. 2 | 3.1 | 0.05 | 8.3 | — | 3.6 | 1.1 | 8.1 | — | Balance |
| Com. Ex. 1 | 3.1 | 0.05 | 8.3 | — | 3.6 | 1.1 | 8.1 | — | Balance |
| Com. Ex. 2 | 3.1 | 0.05 | 8.3 | — | 3.6 | 1.1 | 8.1 | — | Balance |
| Com. Ex. 3 | 3.1 | 0.05 | 8.3 | — | 3.6 | 1.1 | 8.1 | — | Balance |

TABLE 2

| | Alloy Powder | | Tungsten Carbide Powder | |
|---|---|---|---|---|
| No. | Average Particle Size (μm) | Amount (parts by mass) | Average Particle Size (μm) | Amount (parts by mass) |
| Example 1 | 110 | 60 | 5.0 | 40 |
| Example 2 | 46 | 70 | 13.9 | 30 |
| Example 3 | 117 | 60 | 8.8 | 40 |
| Ref. Ex. 1 | 60 | 75 | 9.0 | 25 |
| Ref. Ex. 2 | 110 | 60 | 5.0 | 40 |
| Com. Ex. 1 | 110 | 60 | 5.0 | 40 |
| Com. Ex. 2 | 110 | 85 | 5.0 | 15 |
| Com. Ex. 3 | 110 | 60 | 200 | 40 |

Each raw material for the lining layer was charged in an amount of forming as thick a centrifugally cast layer as 4 mm into a cylinder of 250 mm in outer diameter, 94 mm in inner diameter and 2500 mm in length made of machine-structural alloy steel (SCM440), and steel lids were welded to both end openings of the cylinder for sealing. This cylinder was put in a furnace having a rotation mechanism, to carry out the first and second heating steps while rotating the cylinder under the conditions shown in Table 3.

TABLE 3

| | First Heating Step | | | Second Heating Step | |
|---|---|---|---|---|---|
| No. | Number of Rotation (rpm) | Heating Temperature (° C.) | Heating Time (minute) | Heating Temperature (° C.) | Heating Time (minute) |
| Example 1 | 6 | 1160 | 30 | 1120 | 60 |
| Example 2 | 20 | 1180 | 30 | 1130 | 90 |
| Example 3 | 10 | 1180 | 30 | 1140 | 90 |
| Ref. Ex. 1 | 20 | 1180 | 30 | 1130 | 60 |
| Ref. Ex. 2 | 6 | 1180 | 90 | — | — |
| Com. Ex. 1 | 0 | 1150 | 30 | — | — |
| Com. Ex. 2 | 10 | 1160 | 30 | 1120 | 60 |
| Com. Ex. 3 | 60 | 1160 | 30 | 1120 | 60 |

After the second heating step, each cylinder was taken out of the furnace, and placed on a centrifugal casting apparatus. A centrifugally cast layer having a thickness of 4 mm was formed by a centrifugal casting method by rotating the cylinder at a gravitational acceleration of 80 G (1230 rpm) on an inner surface of the cylinder, until the temperature was lowered to 700° C. After cooling to room temperature, two disc-shaped samples as thick as 20 mm were cut out of the cylinder at each center position separated 100 mm from each end.

Figure 2:
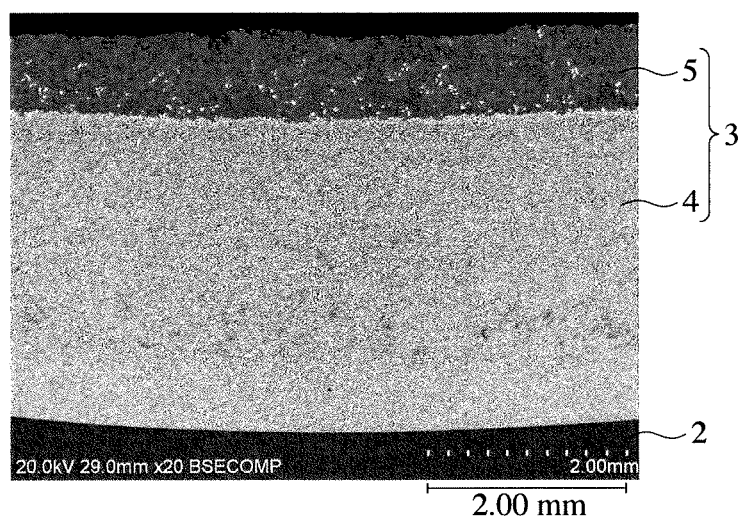
FIG. 2 is a scanning electron photomicrograph showing the centrifugally cast layer of Example 1.
Figure 3:
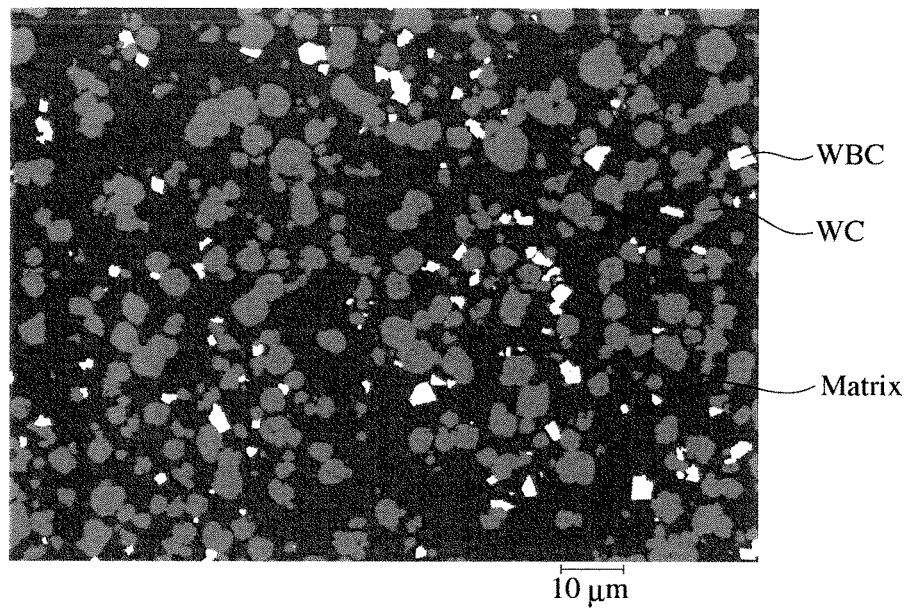
FIG. 3 is a photograph showing the lining layer of Example 1, which is mapping-analyzed by EPMA to identify a matrix, tungsten carbide particles and metal carboboride particles.

Composition/structure-observing samples of about 20 mm×20 mm×20 mm were cut out of each disc-shaped sample from an inner surface of its circular hole circumferentially every 90°, and mirror-polished. The thickness of a particle-lack layer in a centrifugally cast layer of each sample was measured by a scanning electron microscope, to determine its minimum and maximum. Table 8 shows a thickness range of the particle-lack layer. FIG. 2 is a scanning electron photomicrograph showing the centrifugally cast layer 3 of Example 1, and FIG. 3 is a photograph of the lining layer 4 mapping-analyzed by EPMA to identify a matrix, tungsten carbide particles and metal carboboride particles. In FIG. 3, a dark gray portion is a nickel-based alloy matrix, thin gray particles are tungsten carbide (WC) particles, and white particles are metal carboboride (WBC) particles. FIG. 3 shows that WC particles and WBC particles were uniformly dispersed in the nickel-based alloy matrix of the lining layer 4.

The particle-lack layer 5 was removed from each composition/structure-observing sample to analyze components in the lining layer 4. Table 4 shows the composition of the lining layer 4 (average composition including all of an alloy matrix, tungsten carbide and metal carboboride).

TABLE 4

| | Composition (% by mass) of Lining Layer | | | | | | | | | |
|---|---|---|---|---|---|---|---|---|---|---|
| No. | C | B | W | Cr | Fe | Si | Mn | Co | Cu | Ni |
| Example 1 | 2.8 | 1.5 | 42.0 | 3.6 | 4.1 | 1.1 | 0.5 | 4.8 | — | Balance |
| Example 2 | 2.6 | 1.6 | 36.3 | 8.4 | 6.6 | 1.9 | 0.5 | 10.8 | 2.7 | Balance |
| Example 3 | 3.2 | 1.2 | 52.7 | 3.1 | 7.2 | 0.9 | 0.4 | 4.1 | — | Balance |
| Ref. Ex. 1 | 2.6 | 1.6 | 36.3 | 8.4 | 8.3 | 1.9 | 0.5 | 21.6 | 2.7 | Balance |
| Ref. Ex. 2 | 3.2 | 1.2 | 55.7 | 3.1 | 12.1 | 0.9 | 0.4 | 4.1 | — | Balance |
| Com. Ex. 1 | 4.1 | 1.3 | 55.4 | 2.6 | 0.5 | 1.3 | 0.3 | 3.9 | — | Balance |
| Com. Ex. 2 | 1.4 | 1.8 | 23.0 | 4.6 | 5.8 | 1.5 | 0.9 | 7.3 | — | Balance |
| Com. Ex. 3 | 2.7 | 1.5 | 41.9 | 3.9 | 3.6 | 0.9 | 0.6 | 3.5 | — | Balance |

The metal composition of a matrix in each composition/structure-observing sample was analyzed by EDX. Table 5 shows the composition of detectable metal elements in the matrix. Table 6 shows the area percentages and average particle sizes of tungsten carbide particles and metal carboboride particles, and Table 7 shows the composition of metal carboboride particles measured by EPMA.

TABLE 5

| | Composition (% by mass) of Matrix | | | | | | |
|---|---|---|---|---|---|---|---|
| No. | Ni | W | Cr | Fe | Mn | Co | Cu |
| Example 1 | 71.3 | 2.1 | 5.9 | 6.7 | 0.8 | 9.5 | — |
| Example 2 | 51.7 | 4.9 | 10.8 | 8.9 | 0.8 | 15.3 | 4.2 |
| Example 3 | 68.9 | 1.7 | 4.8 | 14.3 | 0.5 | 5.8 | — |
| Ref. Ex. 1 | 24.5 | 4.9 | 13.8 | 11.1 | 0.8 | 36.1 | 4.2 |
| Ref. Ex. 2 | 55.6 | 1.7 | 4.8 | 27.2 | 0.5 | 5.8 | — |
| Com. Ex. 1 | 70.1 | 1.9 | 6.3 | 6.5 | 0.7 | 10.4 | — |
| Com. Ex. 2 | 71.6 | 0.9 | 7.1 | 6.9 | 1.4 | 11.6 | — |
| Com. Ex. 3 | 68.9 | 1.6 | 6.1 | 6.1 | 0.8 | 9.8 | — |

TABLE 6

| | Tungsten Carbide Particles | | Metal Carboboride Particles | |
|---|---|---|---|---|
| No. | % by area | Average Particle Size (μm) | % by area | Average Particle Size (μm) |
| Example 1 | 35.2 | 4.2 | 6.5 | 2.2 |
| Example 2 | 26.7 | 6.4 | 2.3 | 1.1 |
| Example 3 | 33.8 | 3.6 | 2.6 | 1.6 |
| Ref. Ex. 1 | 26.1 | 18.4 | 16.9 | 7.5 |
| Ref. Ex. 2 | 51.9 | 8.6 | 3.2 | 0.7 |
| Com. Ex. 1 | 38.8 | 21.0 | 0.1 | 0.2 |
| Com. Ex. 2 | 17.4 | 4.2 | 2.4 | 2.2 |
| Com. Ex. 3 | 38.6 | 190.0 | 25.7 | 12.3 |

TABLE 7

| | Composition (% by mass) of Metal Carboboride Particles | | | |
|---|---|---|---|---|
| No. | C | B | W | Ni |
| Example 1 | 1.8 | 3.0 | 76.4 | 9.9 |
| Example 2 | 1.6 | 3.2 | 71.6 | 5.2 |
| Example 3 | 1.8 | 2.9 | 75.2 | 7.8 |
| Ref. Ex. 1 | 1.6 | 3.2 | 71.6 | 2.6 |
| Ref. Ex. 2 | 1.8 | 2.9 | 75.2 | 7.8 |
| Com. Ex. 1 | 0.3 | 3.2 | 70.4 | 8.1 |
| Com. Ex. 2 | 1.7 | 2.8 | 55.2 | 27.1 |
| Com. Ex. 3 | 1.9 | 3.5 | 76.2 | 13.5 |

Figure 4:
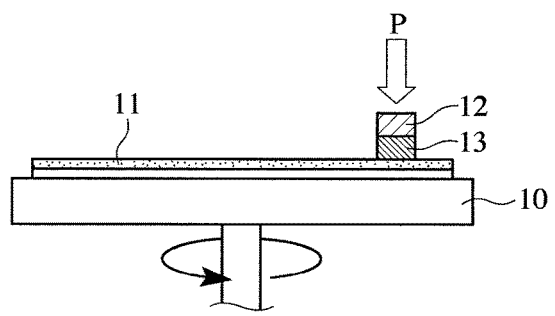
FIG. 4 is a schematic view showing an abrasive wear test.

As shown in FIG. 4, a lining layer 13 of a wear test piece of 10 mm in diameter (comprising a cylinder substrate 12 and a lining layer 13) cut out of each disc-shaped sample was pressed at pressure P of 90 N to a SiC sandpaper (#400) 11 on a table 10 rotating at 150 rpm for a predetermined period of time, for an abrasive wear test. Wear was determined from the weight of the test piece before and after the abrasive wear test. The results are shown in Table 8.

TABLE 8

| | Thickness (mm) | | | | |
|---|---|---|---|---|---|
| No. | Centrifugally Cast Layer | Particle-Lack Layer | Wear (mg) | Machinability | Corrosion Resistance |
| Example 1 | 4 | 0.7-0.9 | 2.5 | Good | Good |
| Example 2 | 4 | 0.9-1.1 | 3.4 | Good | Good |
| Example 3 | 4 | 1.2-1.5 | 2.0 | Good | Good |

TABLE 8-continued

| No. | Thickness (mm) Centrifugally Cast Layer | Thickness (mm) Particle-Lack Layer | Wear (mg) | Machinability | Corrosion Resistance |
|---|---|---|---|---|---|
| Ref. Ex. 1 | 4 | 1.5-1.6 | 3.6 | Good | Fair |
| Ref. Ex. 2 | 4 | 1.6-1.9 | 2.2 | Good | Poor |
| Com. Ex. 1 | 4 | 2.2-2.9 | 2.3 | Poor | Good |
| Com. Ex. 2 | 4 | 1.4-1.9 | 12.5 | Good | Good |
| Com. Ex. 3 | 4 | 1.1-1.5 | 2.7 | Poor | Good |

The particle-lack layer 5 was removed by grinding from the centrifugally cast layer 3 of each cylinder after the disc-shaped sample was cut out. An inner-surface corner portion of each cylinder was cut by turning with a CBN tool, to evaluate machinability with the detaching and chipping of tungsten carbide particles and metal carboboride particles from the lining layer 4, by the following standard. The results are shown in Table 8.

Good: Detaching and chipping did not occur.
Poor: Detaching or chipping occurred.

A corrosion resistance-evaluating sample of 1.5 mm in thickness, 4.0 mm in width and 10 mm in length was cut out of the lining layer 4. Each sample was immersed in an 18-% hydrochloric acid solution at 50° C. for 24 hours, to evaluate corrosion resistance with a weight reduction ratio by immersion by the following standard. The results are shown in Table 8.

Good: The weight reduction ratio was less than 7%.
Fair: The weight reduction ratio was 7% or more and less than 15%.
Poor: The weight reduction ratio was 15% or more.

When each centrifugally cast layer 3 of Examples 1-3 was cut to the depth of 2 mm, the particle-lack layer 5 was completely removed, so that the lining layer 4 was exposed to the entire inner surface of the cylinder. Thereafter, the outer periphery and ends, etc. of the cylinder 2 were machined to produce a molding machine cylinder 1. When injection molding was conducted using the molding machine cylinder 1 of Example 1, it was confirmed that the lining layer 4 had good wear resistance and corrosion resistance.

On the other hand, when the centrifugally cast layer 3 of Comparative Example 1 was cut to the depth of 2 mm, a too thick particle-lack layer 5 was not completely removed, failing to have a lining layer 4 on the entire inner surface of the cylinder.

When each centrifugally cast layer of Reference Examples 1 and 2 and Comparative Example 2 was cut to the depth of 2 mm, the particle-lack layer 5 was completely removed to expose a lining layer 4. A molding machine cylinder 1 was then produced by machining. However, when injection molding was conducted using the molding machine cylinder 1 of Reference Example 1, the lining layer 4 was slightly poor in corrosion resistance because the matrix had a relatively small Ni content. When injection molding was conducted using the molding machine cylinder 1 of Reference Example 2, the lining layer 4 did not exhibit sufficient corrosion resistance because the lining layer had a large Fe content. When injection molding was conducted using the molding machine cylinder 1 of Comparative Example 2, the lining layer 4 was prematurely worn because of too small an area ratio of tungsten carbide particles, failing to exhibit sufficient wear resistance.

As is clear from Table 8, the thickness differences between the maximum and minimum (unevenness) of the particle-lack layers 5 in Examples 1-3 were within a range of 0.1-0.3 mm. On the other hand, the thickness unevenness of the particle-lack layers 5 in Comparative Examples 1-3 was as large as 0.4-0.7 mm. This indicates that in Examples 1-3, the thickness of the particle-lack layer 5 is stably controlled.

DESCRIPTION OF REFERENCE NUMERALS

1: Molding machine cylinder
2: Cylinder
3: Centrifugally cast layer
4: Lining layer
5: Particle-lack layer
6: Hollow portion
11: Sandpaper
12: Substrate of test piece
13: Lining layer of test piece

What is claimed is:

1. A molding machine cylinder comprising a lining layer formed on an inner surface of a steel cylinder by a centrifugal casting method;
said lining layer having a structure comprising 20-50% by area of tungsten carbide particles and 1-10% by area of tungsten-based metal carboboride particles in a nickel-based alloy matrix; and said lining layer containing 1-7.5% by mass of Fe wherein the % by area is based on a cross section of the lining layer, wherein said metal carboboride particles contain 0.5-4% by mass of C, 0.5-6% by mass of B, 65-85% by mass of W, and 1-20% by mass of Ni.

2. The molding machine cylinder according to claim 1, wherein said metal carboboride particles have an average particle size of 0.5-5 μm.

3. The molding machine cylinder according to claim 1, wherein said tungsten carbide particles have an average particle size of 1.5-15 μm.

4. The molding machine cylinder according to claim 1, wherein said lining layer comprises 1.5-4% by mass of C, 0.5-3.5% by mass of B, 25-60% by mass of W, 1-10% by mass of Cr, 1-15% by mass of Co, 0.1-3% by mass of Si, 0.1-2% by mass of Mn, and 0-5% by mass of Cu, the balance being nickel and inevitable impurities.

5. The molding machine cylinder according to claim 4, wherein a matrix of said lining layer comprises 0.05-1% by mass of C, 0.5-3% by mass of B, 1-5% by mass of W, 2-20% by mass of Cr, 2-30% by mass of Co, 0.2-5% by mass of Si, 0.2-5% by mass of Mn, 2-15% by mass of Fe, and 0-10% by mass of Cu, the balance being nickel and inevitable impurities.

* * * * *